United States Patent
Liu et al.

(10) Patent No.: US 10,158,223 B2
(45) Date of Patent: Dec. 18, 2018

(54) METHOD FOR GENERATING CURRENT DIFFERENTIAL PROTECTION SUPERNODE BASED ON ELECTRICAL TOPOLOGY OF REGIONAL DISTRIBUTION NETWORK

(71) Applicants: XJ GROUP CORPORATION; STATE GRID CORPORATION OF CHINA, Beijing (CN)

(72) Inventors: Xing Liu, Xuchang (CN); Xiaohui Song, Xuchang (CN); Yong Wei, Xuchang (CN); Guobin Li, Xuchang (CN); Dingguo Wang, Xuchang (CN); Junfeng Di, Xuchang (CN)

(73) Assignees: XJ GROUP CORPORATION, Xuchang (CN); STATE GRID CORPORATION OF CHINA, Beijing (CN)

( * ) Notice: Subject to any disclaimer, the term of this patent is extended or adjusted under 35 U.S.C. 154(b) by 1571 days.

(21) Appl. No.: 13/652,488

(22) Filed: Oct. 16, 2012

(65) Prior Publication Data

US 2013/0261829 A1  Oct. 3, 2013

(30) Foreign Application Priority Data

Apr. 1, 2012  (CN) .......................... 2012 1 0095645

(51) Int. Cl.
*H02H 7/28* (2006.01)
*H02H 7/26* (2006.01)
*H02J 3/00* (2006.01)

(52) U.S. Cl.
CPC ............... *H02H 7/28* (2013.01); *H02H 7/261* (2013.01); *H02J 3/00* (2013.01); *H02J 2003/007* (2013.01); *Y02E 60/76* (2013.01); *Y04S 40/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,420,495 A | * | 5/1995 | Hingorani | ................. G05F 1/66 323/218 |
| 5,734,586 A | * | 3/1998 | Chiang | ..................... H02J 3/16 307/31 |

(Continued)

*Primary Examiner* — Kidest Batha
(74) *Attorney, Agent, or Firm* — Platinum Intellectual Property LLP

(57) ABSTRACT

The present invention relates to a method for generating a current differential protection supernode based on an electrical topology of a regional distribution network, which belongs to the fields of automation of electrical power systems and relay protection. The present invention generates several supernode differential protection elements, i.e., differential protection objects, and backup differential protection elements by circularly using a depth-first search method according to the inputted branch-node associative data table reflecting the electrical topology of the distribution network. the present invention can accurately located and quickly isolate the faults in the distribution network system, reduce the probability of power cut in the non-fault lines, reduce the coverage of power cut, quickly reconstruct and self-heal the distribution network, and solve the effect of the distributed access system on the distribution network protection.

5 Claims, 3 Drawing Sheets

(56) References Cited

U.S. PATENT DOCUMENTS

| | | | | |
|---|---|---|---|---|
| 6,181,984 B1* | 1/2001 | Sawa | ............... | H02J 3/00 |
| | | | | 700/286 |
| 6,538,991 B1* | 3/2003 | Kodialam | ........... | H04L 41/5003 |
| | | | | 370/229 |
| 2006/0238364 A1* | 10/2006 | Keefe | ................ | G05B 23/0267 |
| | | | | 340/646 |
| 2009/0265041 A1* | 10/2009 | Benjamin | ................ | G05B 9/02 |
| | | | | 700/292 |
| 2009/0299538 A1* | 12/2009 | Suzuki | ................ | G06F 1/3209 |
| | | | | 700/292 |
| 2010/0185338 A1* | 7/2010 | Montgomery | ............ | H02J 3/14 |
| | | | | 700/292 |

* cited by examiner

METHOD FOR GENERATING CURRENT DIFFERENTIAL PROTECTION SUPERNODE BASED ON ELECTRICAL TOPOLOGY OF REGIONAL DISTRIBUTION NETWORK

CROSS-REFERENCE TO RELATED APPLICATION

This application claims the priority benefit of Chinese application No. 201210095645.9, filed on Apr. 1, 2012. The entirety of the above-mentioned patent application is hereby incorporated by reference herein and made a part of specification.

BACKGROUND OF THE INVENTION

1. Field of the Invention

The present invention relates to a method for generating a current differential protection supernode based on an electrical topology of a regional distribution network, which belongs to the fields of automation of electrical power systems and relay protection.

2. Background of the Invention

In order to improve the power supply reliability of distribution systems, loop network structure has been adopted in the existing distribution network. Under the loop network structure, however, it is difficult to tune setting values protected by feeding lines of a substation and main lines of a distribution network in which the main protection object is over-current protection, and the setting values can not match the time delay. Moreover, the introduction of distributed power supply changes the topological structure of the original distribution network from signal power supply radiation shape to multi-power supply network structure, which has a great effect on the relay protection of the distribution network. Based on the above reasons, it is necessary to design a new protection strategy appropriate for continuously developed distribution network.

The application of optical fiber composite cable technique provides a good basis for construction of optical fiber communication channels for the distribution network. The quickly developed network technique satisfies the increasing requirements for transmission ability, safety and reliability of the network. IEC 61850 standard has been maturely applied to the intelligent substation. With the fast development of computer technology and information technology, the integration of the hardware platform for relay protection increases, and the reliability thereof improves greatly. The applications of these advanced technologies establish the basis of information sharing and intelligent distribution network, and also provide the possibility for new principle, research of new solutions and implementations. Therefore, the new relay protection of the distribution network shall face the whole regional distribution network, instead of a single power supply line. The design idea of centralized network protection is already to be implemented.

Since it is not necessarily configured with three-phase PT, or only configured with signal-phase PT at positions to be protected in each supply section of the distribution network, considering the selection and sensibility, the protection based on a current differential principle is the most suitable new relay protection of the distribution network. However, due to cost, maintenance, etc., it is improper to configure the current differential protection at each supply line section of the distribution network. Thereby, the centralized differential protection facing the regional distribution network is the most optimal solution. The function of the centralized differential protection is to accurately and quickly locate and isolate the fault sections of the distribution network supply line, and the protection operation time can be improved to 50 ms. The centralized protection system of the regional distribution network may be consisted of one centralized protection apparatus and several distributed intelligent terminals. The centralized protection system is configured with a whole-line quick-action protection-differential protection. The distribution terminals collect and upload analogy data on the spot, and configure the fundamental backup protection. The centralized protection system of the distribution network can accurately locate and quickly isolate the fault within the distribution network system, reduce the probability of power cut in the non-fault lines, reduce the coverage of power cut, quickly reconstruct and self-healing the distribution network, and solve the effect of the distributed access system on the distribution network protection.

BRIEF SUMMARY OF THE INVENTION

The object of the present invention is to solve the problem of how the centralized protection apparatus could convert the electrical topology of the regional distribution network into several minimal differential protection objects.

For solving the above technical problems, the present invention provides a method for generating a current differential protection supernode based on electrical topology of regional distribution network, which method comprising the steps of:

1) creating a branch-node data table according to the electrical topology of the regional distribution network, and finding a relation between the branch and the node as well as the measuring points conditions on the branch;

2) searching for the branch which includes two measuring points according to said branch-node data table, and storing the two measuring points on each branch into a measuring point action aggregate of supernode differential protection corresponding to each branch so as to form a branch differential supernode;

3) searching for numbers of the branches associated with measurements of each node according to the branch-node data table, and storing the result into a supernode aggregate array corresponding to each node so as to form a node differential supernode;

4) searching for the supernodes connected with each measuring point, and numbering respective supernode at which each measuring point is located into a backup supernode aggregate so as to form a backup differential supernode.

The step 3) comprises the steps of:

a. forming a node-branch associative data table according to contents of branch-node associative array, and storing numbers of all alternating branches connected with each node;

b. processing each node based on the node-branch association data table;

c. judging whether the node has injection current, if yes, storing this node into the corresponding threshold aggregate of supernode differential protection;

d. reading out the numbers of the associated branches connected with the node, and inquiring measuring flag of the branch in the branch-node data table inputted with data according to the branch number; wherein if the branch is provided with a measuring point, storing the measuring point of the branch into the measuring action aggregate of supernode differential protection as one supernode measuring point of the node; otherwise, if a branch is not provided with a measuring point, reading out number of the node on the other end of the branch, and the process returns to step c;

e. repeating the above steps to search for the numbers of the measurement branch associated with each node, and storing the result to the supernode aggregate array corresponding to each node so as to obtain supernode differential protection elements of all the nodes.

During the process of searching for supernode, if a branch is included, checking whether the branch is a cable, if yes, a leakage current due to a charging capacitor of the cable is considered and the leakage current is added into the threshold aggregate of supernode differential protection.

The advantageous effects of the present invention follow. The present invention generates several supernode differential protection elements (i.e., differential protection objects) and backup differential protection elements by circularly using a depth-first search method according to the inputted branch node associative data table reflecting the electrical topology of the distribution network. Thus, the present invention can accurately located and quickly isolate the faults in the distribution network system, reduce the probability of power cut in the non fault lines, reduce the coverage of power cut, quickly reconstruct and self-heal the distribution network, and solve the effect of the distributed access system on the distribution network protection.

DETAILED DESCRIPTION OF THE EMBODIMENTS

Hereinafter, further explanations to the embodiments of the present invention will be given by reference to the accompanying drawings.

The current differential supernode is a circuit which is encompassed by closed curve surfaces and satisfies Kirchhoff's current law. All the nodes and branches (i.e., busbars and lines) included in any one of the closed curve surfaces may constitute a supernode. One of the features of the distribution network is that it is unnecessary to arrange a current transformer (i.e., no measuring point) at head end or tail end of a power supply line section. For example, there is no measuring point at the head end of the branch L2 in FIG. 1.

Figure 1:
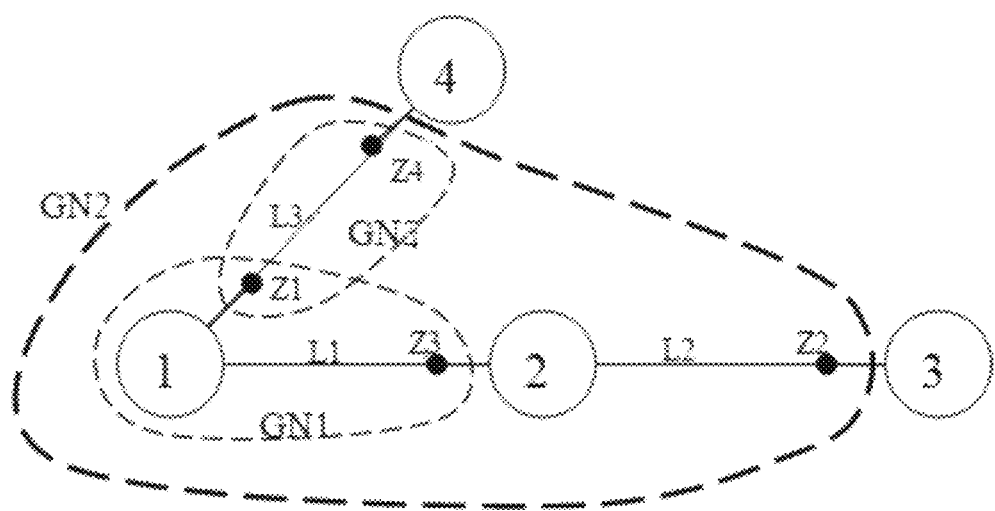
FIG. 1 is a structural drawing showing three types of current differential supernodes in the present invention.
Figure 2:
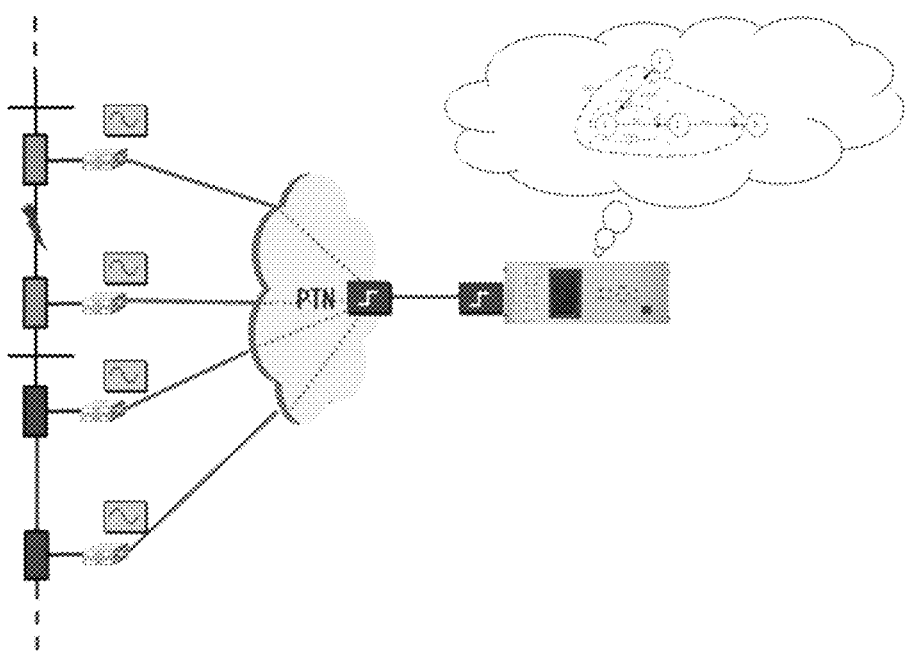
FIG. 2 is a structural drawing showing a centralized protection system of a regional distribution network.

Firstly, as shown in FIG. 1, three types of current differential supernodes are defined to include branch differential, node differential and supernode differential, wherein the branch differential and node differential are special cases of the supernode differential. The branch differential is a supernode differential protection (excluding node) which is provided with measurements at two ends of the branch, such as GN3 in FIG. 1, in which both ends of the branch L3 are provided with measurements Z1 and Z4; the node differential provides measurements to all the branches connected with the node (in FIG. 1, all the branches connected with the node 1) so as to form supernode GN1 differential protection; the supernode differential is like the supernode GN2 shown in FIG. 1 which includes branches and two nodes. In fact, considering the selection and reliability, three types of protections are provided: differential protection, backup differential protection, and backup protection after breaker fails. In FIG. 1, when GN1 differential protection fails, the backup supernode GN2 differential protection serves as the backup protection for the supernode GN1; when GN1 is in an internal short circuit, the breaker corresponding to the measuring point Z3 works normally, while the breaker corresponding to the measuring point Z1 does not work. In order to minimize the areas affected by the fault, only the breakers corresponding to Z3 and Z4 are needed to work, i.e., the backup supernode GN3 serves as the backup protection for the supernode GN1, such that the range affected by the fault is minimized. From above, the backup protections are different when the same supernode differential protects faults at different measuring points. The backup protection shall be carried out with respect to the measuring points. The backup protection of the supernode differential protection is to seek for backup supernode differential protection of each measuring point, and this backup supernode is constituted by two supernodes connected with the measuring point.

The method for generating supernode differential protection element comprises: generating several supernode differential protection elements (i.e., differential protection objects) and backup differential protection elements by circularly using a depth-first search method according to the inputted branch-node associative data table reflecting the electrical topology of the distribution network. The specific procedures follow:

1. For the branch differential (corresponding to range of tripping due to short circuit false of the branch which has measurements at both ends), inquiring the measuring flag of the branch L based on the inputted branch-node associative data table, i.e., in the branch-node table inputted with data, if both ends have the measuring points, storing the two measuring points into a measuring point action aggregate of supernode differential protection corresponding to the branch.

2. For the node differential:
   (1) firstly, forming a node-branch associative data table according to the contents of the branch-node associative array, and storing the numbers of all the alternating branches connected with the branch;
   (2) processing each node based on the node-branch associative data table;
   (3) judging whether the node has current injection, if yes, saving the node into the corresponding threshold aggregate of supernode differential protection;
   (4) reading out the number of the first associated branch connected with the node I, and inquiring the measuring flag of this branch in the branch-node table inputted with data according to the branch number, if this branch is provided with measurement, storing the measuring point of the branch as one supernode measuring point of the node I into the supernode differential protection measuring point action aggregate, and continuing to seek for other branches; if all the branches connected with the node I have measurement, it indicates the branch included in the supernode corresponding to the node I has been determined, then outputting the measuring points of all the branches connected with the node to the measuring point aggregate of supernode differential protection of the supernode corresponding to the node I; otherwise, if a branch has no measuring point, reading out the node number J of the other end of this branch, and returning to step (3) to proceed the procedure.

The depth-first search method is circularly used to find the numbers of the associated measured branches of each node and to save the result to the supernode aggregate array corresponding to each node.

Figure 3:
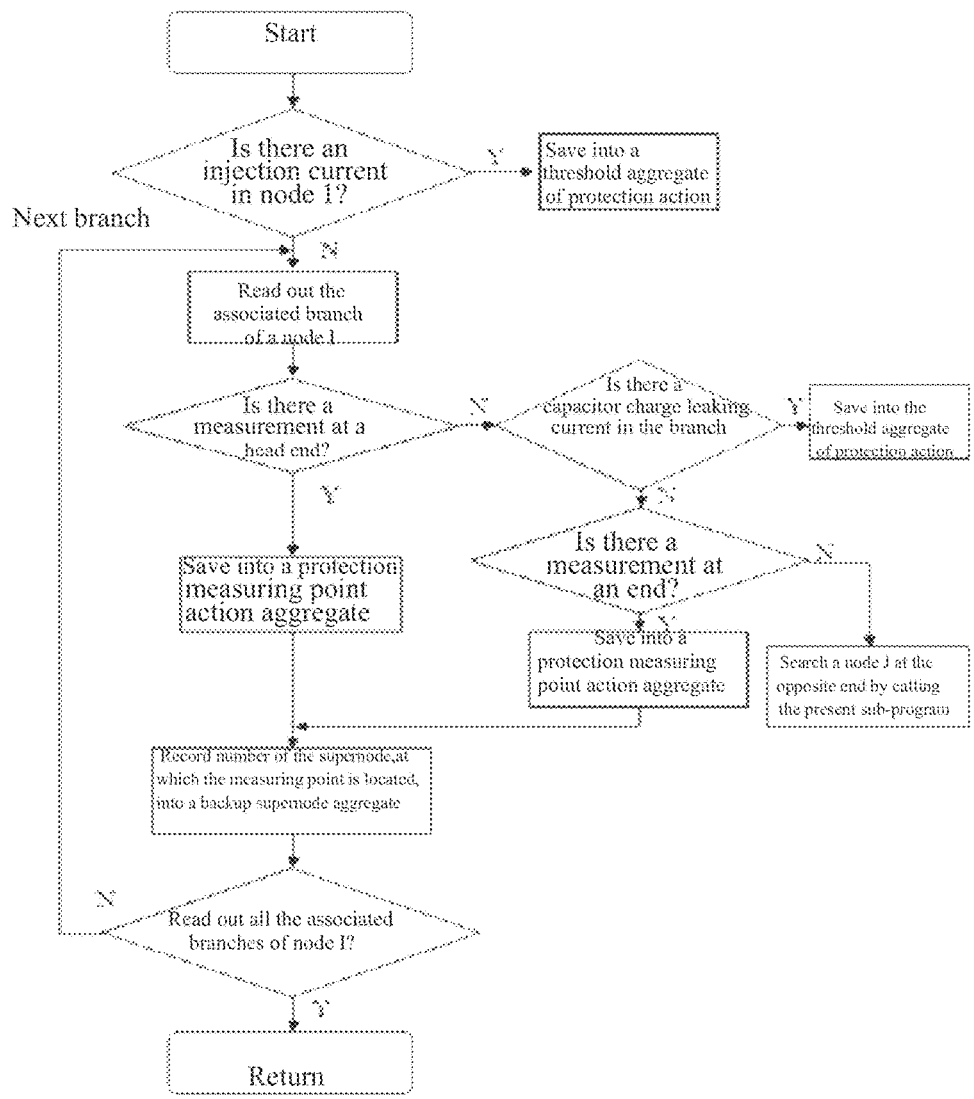
FIG. 3 is a flowchart showing a method for generating supernode including node I in an embodiment of the present invention.

In addition, if the supernode includes a branch, checking whether the branch is a cable or not. If yes, a leaking current due to the discharge capacitor of the branch shall be considered, and the leaking current is added into the threshold aggregate of the supernode differential protection. Meanwhile, during the procedure of seeking for the measuring points of the supernodes, the numbers of each supernode are recorded into the backup supernode aggregate. The supernode algorithm in which the searched measuring points include node I is shown in the flowchart of FIG. 3.

Figure 4:
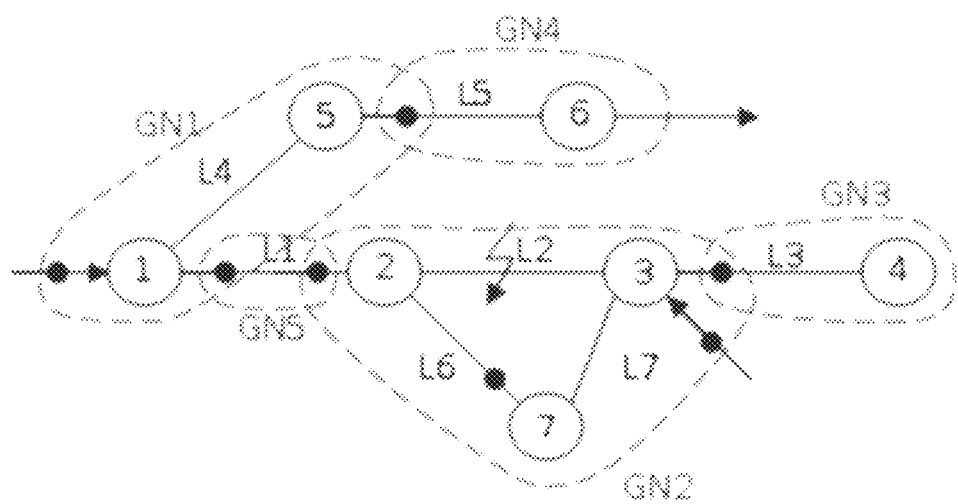
FIG. 4 is a generating scheme of an electrical topology and desired supernodes in an embodiment of the present invention.

Example: hereinafter, the system shown in FIG. 4 is taken as an example for explaining the above algorithm. Nodes 1 and 3 are generator nodes, node 6 is a load node, and the charge capacitor of the cable line of the branch L6 is large. The known branch data is shown in table 1, measuring flag: 0—no measurement, 1—measurement; on/off flag: 0—cut off; 1—close. The node data is shown in table 2: injection current flag: 0—no injection current, 1—injection current.

TABLE 1 branch-node table (0—no measurement; 1—measurement; 0—cut off; 1—close)

| Branch No. | First node | End node | Measuring flag at head end | Measuring flag at end | On/off flag | Current measuring value at head end | current measuring value at end | capacitive charging current |
|---|---|---|---|---|---|---|---|---|
| 1 | 1 | 2 | 1 | 1 | 1 | 5 | −5 | 0 |
| 2 | 2 | 3 | 0 | 0 | 1 | — | — | 0 |
| 3 | 3 | 4 | 1 | 0 | 1 | 0 | — | 0 |
| 4 | 1 | 5 | 0 | 0 | 1 | — | — | 0 |
| 5 | 5 | 6 | 1 | 0 | 1 | 5 | — | 0 |
| 6 | 2 | 7 | 0 | 1 | 1 | — | 2 | 2 |
| 7 | 3 | 7 | 0 | 0 | 1 | — | — | 0 |

TABLE 2 node table (0—no current injection; 1—current injection; 0—no measurement; 1—measurement; 0—cut off; 1—close)

| Node No. | Current injection flag | Measuring flag | On/off flag | Maximum current injection | Actual current |
|---|---|---|---|---|---|
| 1 | 1 | 1 | 1 | 3 | 10 |
| 2 | 0 | 0 | 0 | 0 | 0 |
| 3 | 1 | 1 | 1 | 3 | 10 |
| 4 | 0 | 0 | 0 | 0 | 0 |
| 5 | 0 | 0 | 0 | 0 | 0 |
| 6 | 1 | 1 | 1 | −1 | −5 |
| 7 | 0 | 0 | 0 | 0 | 0 |

The table for the output magnitude of supernode is shown in table 3. The sum of all the branch current of the supernode GN2 is 5.0, which is the sum of currents flowing from the branches L1 and L3 into the supernode. If this current is larger than the threshold current −8.0, there is a short circuit in the protection area of the supernode GN2. The threshold current −8.0 is the sum of the current −10.0 of the supply node 3 and the current 2.0 of the cable line branch L6, wherein the polarity of the current flowing out is positive, and the current flowing in is negative.

TABLE 3 supernode

| Supernode No. | Branch (1 indicates measuring point at head end, 2 indicates measuring point at end, + indicates current flow in, − indicates current flow out) | Action branch | No. of the node which has injection current | Cable branch No. | Sum of current flowing into branch of supernode | Sum of threshold current (+ indicates flowing out) |
|---|---|---|---|---|---|---|
| GN1 | 1(−1) 5(−1) | 15 | 15 | | −10.000000 | 10.000000 |
| GN2 | 1(−2) 3(−1) | 13 | 3 | 6 | 5.000000 | −8.000000 |
| GN3 | 3(1) | 3 | | | 0.000000 | 0.000000 |
| GN4 | 5(1) | 5 | | | 5.000000 | 5.000000 |
| GN5 | 1(1) 1(2) | 1 | | | 0.000000 | 0.000000 |

The backup protection is shown in table 4. The measuring point of the supernode GN2 is located at the end of the branch 1 and the head end of the branch 3, thereby its backups are respectively the supernode GN5 and GN3.

TABLE 4 backup protection

| Branch No. | Supernode No. of measuring point at head end of branch | | Supernode No. of measuring point at end of branch | |
|---|---|---|---|---|
| | Current flowing in | Current flowing out | Current flowing in | Current flowing out |
| 1 | GN 5 | GN 1 | GN 5 | GN 2 |
| 2 | 0 | 0 | 0 | 0 |
| 3 | GN 3 | GN 2 | 0 | 0 |
| 4 | 0 | 0 | 0 | 0 |
| 5 | GN 4 | GN 1 | 0 | 0 |
| 6 | 0 | 0 | 0 | 0 |
| 7 | 0 | 0 | 0 | 0 |

It can be known from the above-mentioned embodiments, if the current value of the measuring points, the injection current values of the nodes and system structure are known, the lines needed to be cut off in the failed area and the backup protection in the case that respective breaker does not work, can be found according to the supernode differential protection algorithm, so as to ensure the cut off of the failure in the electricity grid.

The above embodiments are only for illustration, but not for limiting the technical method in the present invention. Although the present invention is described in detail with reference to the above embodiments, the person skilled in the art would understand that the amendments or equivalent of the present invention without departing from the scope and gist of the present invention should fall within the protection scope of the present invention.

What is claimed is:

1. A computer-implemented method for generating a current differential protection supernode based on an electrical topology of a regional distribution network, comprising:
   1) creating, by an application executing on a computing device, a branch-node data table according to the electrical topology of the regional distribution network, and finding relations between a plurality of branches and a plurality of nodes as well as a plurality of measuring points on the plurality of branches;
   2) searching for a branch which includes two measuring points according to said branch-node data table, and storing the two measuring points on the branch into a measuring point action aggregate of supernode differential protection corresponding to the branch so as to form a branch differential supernode;
   3) determining numbers of the branches associated with measurements of each node according to the branch-node data table, and storing the result into a supernode aggregate array corresponding to each node so as to form a node differential supernode; and
   4) searching for supernodes connected with each measuring point, and numbering respective supernode at which each measuring point is located into a backup supernode aggregate so as to form a backup differential supernode,
   wherein the node differential supernode and backup differential supernode are configured to:
   identify faults in the regional distribution network; and
   reconstruct the regional distribution network by bypassing the identified faults.

2. The computer-implemented method as claimed in claim 1, wherein 3) further comprises:
   a. forming a node-branch associative data table according to contents of branch-node associative array, and storing numbers of all alternating branches connected with each node;
   b. processing each node based on the node-branch association data table;
   c. determining whether each node has injection current, if yes, storing this node into the corresponding threshold aggregate of supernode differential protection;
   d. reading out the numbers of the associated branches connected with each node, and inquiring measuring flag of each branch in the branch-node data table inputted with data according to the branch number; wherein if a first branch is provided with a measuring point, storing the measuring point of the first branch into the measuring action aggregate of supernode differential protection as one supernode measuring point of a first node; otherwise, if a second branch is not provided with a measuring point, reading out number of a second node on the other end of the branch, and the process returns to step c; and
   e. repeating the above steps to search for the numbers of measurement branches associated with each node, and storing the result to the supernode aggregate array corresponding to each node so as to obtain supernode differential protection elements of the plurality of nodes.

3. The computer-implemented method as claimed in claim 1, wherein during the process of searching for the supernodes, if a branch is included, checking whether the branch is a cable, if yes, a leakage current due to a charging capacitor of the cable is considered and the leakage current is added into the threshold aggregate of supernode differential protection.

4. A computer-implemented method for generating a current differential protection supernode based on an electrical topology of a regional distribution network, comprising:
   1) creating, by an application executing on a computing device, a branch-node data table according to the electrical topology of the regional distribution network, and finding relations between a plurality of branches and a plurality of nodes as well as a plurality of measuring points on the plurality of branches;
   2) searching for a branch which includes two measuring points according to said branch-node data table, and storing the two measuring points on the branch into a measuring point action aggregate of supernode differential protection corresponding to the branch so as to form a branch differential supernode;
   3) determining numbers of the branches associated with measurements of each node according to the branch-node data table, and storing the result into a supernode aggregate array corresponding to each node so as to form a node differential supernode; and
   4) searching for supernodes connected with each measuring point, and numbering respective supernode at which each measuring point is located into a backup supernode aggregate so as to form a backup differential supernode,
   wherein 3) further comprises:
      a. forming a node-branch associative data table according to contents of branch-node associative array, and storing numbers of all alternating branches connected with each node;
      b. processing each node based on the node-branch association data table;
      c. determining whether each node has injection current, if yes, storing this node into the corresponding threshold aggregate of supernode differential protection;
      d. reading out the numbers of the associated branches connected with each node, and inquiring measuring flag of each branch in the branch-node data table inputted with data according to the branch number; wherein if a first branch is provided with a measuring point, storing the measuring point of the first branch into the measuring action aggregate of supernode differential protection as one supernode measuring point of a first node; otherwise, if a second branch is not provided with a measuring point, reading out number of a second node on the other end of the branch, and the process returns to step c; and
      e. repeating the above steps to search for the numbers of measurement branches associated with each node, and storing the result to the supernode aggregate array corresponding to each node so as to obtain supernode differential protection elements of the plurality of nodes; and
   wherein the node differential supernode and backup differential supernode are configured to:
   identify faults in the regional distribution network; and
   reconstruct the regional distribution network by bypassing the identified faults.

5. The computer-implemented method as claimed in claim 4, wherein during the process of searching for supernode, if a branch is included, checking whether the branch is a cable, if yes, a leakage current due to a charging capacitor of the cable is considered and the leakage current is added into the threshold aggregate of supernode differential protection.

* * * * *